(No Model.)
H. S. LONG.
GUIDE FOR BAND SAWS.
No. 535,383.  Patented Mar. 12, 1895.
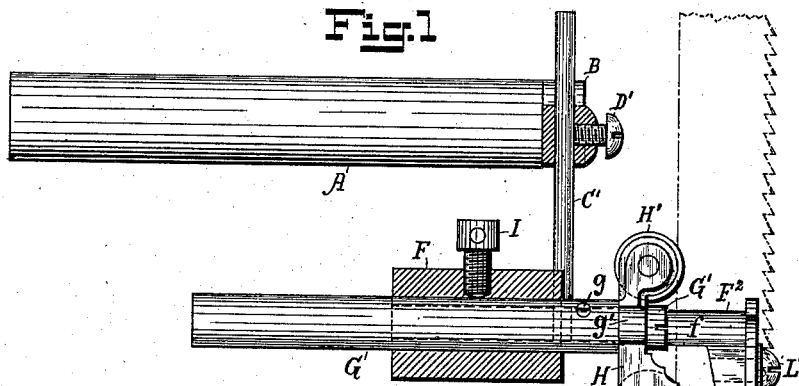
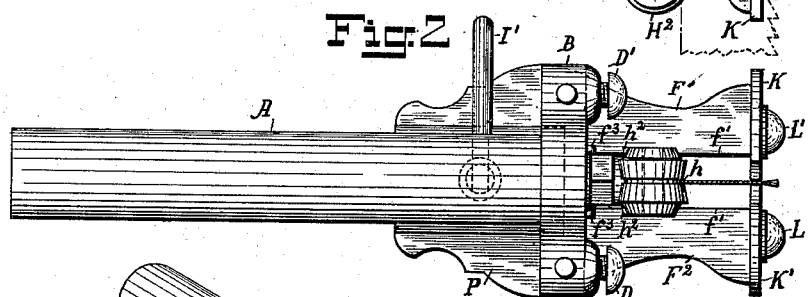
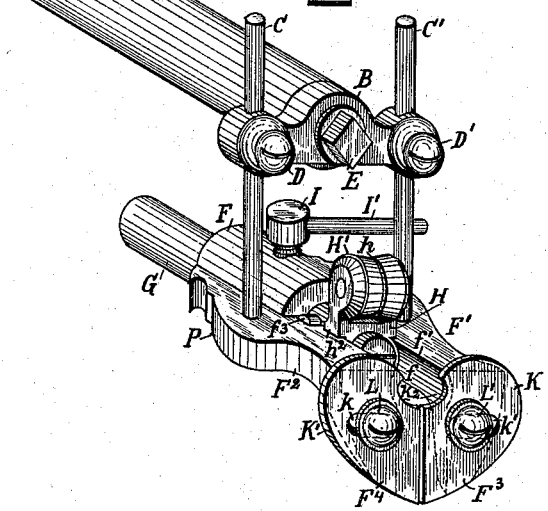
Witnesses:
Emil Reichelt
Fred May
Inventor
Harris S. Long
by Reichelt & Oltsch
Atty's

UNITED STATES PATENT OFFICE.

HARRIS S. LONG, OF SOUTH BEND, INDIANA.

GUIDE FOR BAND-SAWS.

SPECIFICATION forming part of Letters Patent No. 535,383, dated March 12, 1895.

Application filed February 19, 1894. Serial No. 500,770. (No model.)

*To all whom it may concern:*

Be it known that I, HARRIS S. LONG, a citizen of the United States, and a resident of South Bend, in the county of St. Joseph and State of Indiana, have invented certain new and useful Improvements in Guides for Band-Saws, of which the following is a specification.

The object of my invention is to provide a saw guide with rollers, to receive the back thrust and together with side plates to hold the saw in place and which may be quickly and accurately adjusted to saws of different gage and without undue frictional contact which latter would cause the saw to become case hardened and crystallized upon its back edge or lose its temper at the cutting edge by reason of frictional heat.

The invention consists generally in certain constructions and combinations of parts which secure a perfectly adjustable frictionless rolling back edge bearing and an improved side bearing which may be accurately adjusted and which will hold the saw close to its work without hiding the pattern lines and also admit of the adjustment of the back edge rollers without disturbing the adjustment of the side bearing plates.

In the accompanying drawings:—Figure 1, is a sectional side elevation; Fig. 2, a plan with the saw in section; Fig. 3, a perspective of my improved band saw guide ready for attachment to the frame arm standard of a band sawing machine.

The arm A, which is attached to or forms a part of the ordinary adjustable frame arm standard, carries a cross head B, the ends of which are bored to receive vertically adjustable guide standards C, C', secured thereto respectively by cramp screws D, D', and the said cross head B, is adapted to be set upon the arm A, and secured thereto by means of the cramp bolt or nut E, fitted upon the end of the arm A, to hold the guide standards C, C', truly in a vertical position.

The lower ends of the guide standards C, C', are firmly secured to the opposite sides of the inner end of the block P, to raise and lower and attach the latter to the frame arm cross head to adjust and hold it together with its attachments in close proximity to the work which is supported and moved upon the table of the machine.

The inner end of the block P, has a hub F, bored to receive a gudgeon G, the outer end of which is reduced at $g'$, to receive the back guide roller head H, which is secured thereto by a screw nut G' and the said gudgeon and its roller head are adjustably secured in the hub F, by a cramping bolt I, upon the hub which impinges upon the said gudgeon thus allowing the roller head to be adjusted to or from the outer end of the block P, to be adapted to receive saws of different width.

The cramping bolt I, may be operated by a wrench or by a pin lever I', as shown in the drawings.

The roller head H, has end projecting bearings to receive the spindles of the rollers H', $H^2$, at suitable distances respectively above and below the axis of the gudgeon G, and each of the said rollers have a double inwardly coned periphery. The reduced middle portion $h$, of which being held in the same vertical plane and the band saw is thus held opposite thereto in said plane by the opposing coned surfaces of the said friction rollers H', $H^2$ which will not bind the saw but hold it closely up to its work and prevent it from swerving from its true path without undue friction, the cone surfaces serving to return the saw to its true path from either side should it become displaced by unusual causes.

The outer end of the block P, is bifurcated and forms parallel arms F', $F^2$, terminating in short downwardly projecting elbows $F^3$, $F^4$, which provide extended flat bearings for side plates K, K', and also receive the clamping screws L, L', which pass through curved slots $k$, $k'$, in said side plates and hold the same firmly in any adjusted position upon the said arms to adapt the said plates to saws of different gage and also to take up the lost motion caused by the wearing away of the plates.

The inner faces $f$ of the arms F', $F^2$, of block P, are concave to receive the rounded hub portion of the roller block H, which is central to the gudgeon G, while the inner edges $f'$, of the said arms are straight and form guides and bearings to receive the shoulders $h^2$, of the roller block H, and serve to hold said block and vertically disposed rollers truly in position and admit of their adjustment to receive saws of different width while the forward end of the gudgeon G, is held securely in its guides and prevented from being vibrated by the swerving of the saw.

The heart shaped plates K, K', have a rounded aperture K², at the upper end thereof to admit a screw driver to act upon the screw nut or head G' of the gudgeon G, to tighten or loosen it without disturbing the side plates K, K', and the lower end of said side plates are pointed thus completing the heart shaped periphery of said plates when they are in place, and adapting them to be placed in close proximity to the work to be operated upon without hiding or obstructing the view of the pattern lines, the aperture K², being centered in line with the gudgeon G, and the screw nut or head G', being reached by a screw driver passed through such aperture, the roller block and rollers may be at any time made fast or loose upon the gudgeon to secure true contact of both rollers with the back of the saw and in the line of its movement without disturbing the other adjustments.

A small lug $f^3$, upon the arms F', F² near the hub F serves to stop the roller block H, and prevent it from being pushed back in its adjustment far enough to allow the rollers to come in contact with the hub, and a pin hole $g$, in the gudgeon permits the latter together with the roller block to be adjusted by means of a pin lever which when inserted in the said pin hole $g$, will allow the gudgeon to be accurately turned until the rollers shall have been adjusted in alignment with the saw.

A light, strong, accurately and quickly adjustable saw guide is thus provided which may be placed in close proximity to the work without obstructing the view of the guide or pattern lines, or being otherwise in the way of the work, and which will hold the saw more steadily than if held at a greater distance from the work. The double coned rollers placed one above the other, and both adapted to accurate adjustment without disturbing the adjustment of the outer side plates, and the peculiar shape and mode of attachment of the said side plates together form a strong, simple and effective device which may be closely adjusted to the sides and the plane of movement of the saw and to the surface lines of the work without binding the latter, and which when set will not be twisted out of adjustment because of the double guide suspension rod supports and the double adjustment of the plates at each side of the saw although the guide block be held considerably below the supporting arm.

It will be observed that the guide block rollers, and plates bear only at the back and at a narrow portion of the front edge of the saw producing little friction but firmly holding the saw where most required.

Because of the peculiar form, construction and arrangement of the parts hereinbefore described and furthermore by such constructions and arrangements of parts, I am enabled to secure a light, strong, durable and compact device which will firmly hold and will not heat the saw and which may be readily adjusted at all points to suit different requirements, be held very close to its work without hiding or covering the same and will because of its double sets of rods, arms, guides, crossheads and blocks be guarded against vibrations from the rapid movement of the saw and hold the latter firmly from swerving from its true path under any conditions of adjustment.

What I claim as my invention, and desire to secure by Letters Patent, is—

1. The saw guide comprising an adjustable bifurcated guide block having a hub at one end and depending elbows at the other end, the hub carrying a gudgeon and friction roller head secured to the latter by a screw nut, and the adjustable heart shaped side plates secured to the elbows of the guide block arms substantially as described.

2. The saw guide comprising an adjustable bifurcated guide block having a hub at one end and depending elbows at the other end, the hub carrying a gudgeon and friction roller head secured to the latter by a screw nut, and the adjustable heart shaped side plates secured to the elbows of the guide block arms, guide rods secured to opposite sides of the guide block, and adjustably secured to the bearings of the cross head of the supporting arm by clamp screws substantially as described.

In testimony that I claim the foregoing as my invention I have signed my name in presence of two subscribing witnesses.

HARRIS S. LONG.

Witnesses:
GEORGE OLTSCH,
JOHN WAGENER, Jr.